United States Patent
Koo

(10) Patent No.: US 12,277,746 B2
(45) Date of Patent: Apr. 15, 2025

(54) ANCHOR-FREE RPN-BASED OBJECT DETECTION METHOD

(71) Applicant: SI Analytics Co., Ltd., Daejeon (KR)

(72) Inventor: Jamyoung Koo, Sejong-si (KR)

(73) Assignee: SI ANALYTICS CO., LTD., Daejeon (KR)

( * ) Notice: Subject to any disclaimer, the term of this patent is extended or adjusted under 35 U.S.C. 154(b) by 358 days.

(21) Appl. No.: 18/009,121

(22) PCT Filed: Jun. 4, 2021

(86) PCT No.: PCT/KR2021/007003
§ 371 (c)(1),
(2) Date: Dec. 8, 2022

(87) PCT Pub. No.: WO2021/251691
PCT Pub. Date: Dec. 16, 2021

(65) Prior Publication Data
US 2023/0237765 A1    Jul. 27, 2023

(30) Foreign Application Priority Data
Jun. 8, 2020  (KR) .......... 10-2020-0068889

(51) Int. Cl.
G06V 10/75      (2022.01)
G06T 7/70       (2017.01)
G06V 10/25      (2022.01)

(52) U.S. Cl.
CPC .......... *G06V 10/751* (2022.01); *G06T 7/70* (2017.01); *G06V 10/25* (2022.01); *G06T 2207/20084* (2013.01)

(58) Field of Classification Search
CPC .... G06V 10/751; G06V 10/25; G06V 10/462; G06V 10/82; G06V 10/764;
(Continued)

(56) References Cited

U.S. PATENT DOCUMENTS 10,438,082 B1 *  10/2019  Kim ............... G06N 20/00
11,551,337 B2 *  1/2023   Tagra .............. G06T 5/50
(Continued)

FOREIGN PATENT DOCUMENTS

KR   1020130105952 A    9/2013
KR     101805318 B1    12/2017
(Continued)

OTHER PUBLICATIONS

Koo et al., "RBox-CNN: Rotated Bounding Box based CNN for Ship Detection in Remote Sensing Image," SIGSPATIAL '18, Nov. 6-9, 2018, 4 pages.
(Continued)

*Primary Examiner* — Michael S Osinski
(74) *Attorney, Agent, or Firm* — Umberg Zipser LLP

(57) ABSTRACT

Disclosed is a computing device for generating region information of at least one object included in an image, the computing device including: a memory including computer-executable components; and a processor for executing the computer-executable components stored in the memory, in which the computer-executable components include: a key point heat map generation component for generating, for the image, a key point heat map including key point information of the at least one object; a non-rotating bounding box generation component for generating a non-rotating bounding box based on the generated key point heat map; a rotating bounding box generation component for generating a rotating bounding box by using the non-rotating bounding box; and a final bounding box generation component for representing a region occupied by the at least one object in the image by using at least one of the non-rotating bounding box or the rotating bounding box.

12 Claims, 7 Drawing Sheets

(58) Field of Classification Search
CPC ...... G06V 10/454; G06V 20/56; G06V 20/58; G06T 7/70; G06T 2207/20084; G06T 2207/20081; G06T 2210/12; G06T 7/10; G06N 3/08; G06N 3/045; G06N 3/084; G06N 20/00; G06N 20/10

See application file for complete search history.

(56) References Cited

U.S. PATENT DOCUMENTS

| | | | |
|---|---|---|---|
| 11,580,363 B2* | 2/2023 | Taslakian | G06N 3/042 |
| 11,830,209 B2* | 11/2023 | Chen | G06T 19/20 |
| 11,854,244 B2* | 12/2023 | Amirghodsi | G06V 10/774 |
| 11,893,777 B2* | 2/2024 | Flament | G06N 3/045 |
| 11,967,080 B2* | 4/2024 | Mustafi | G06V 10/96 |
| 12,154,310 B2* | 11/2024 | Garg | G06V 10/44 |
| 2012/0163706 A1* | 6/2012 | Zhang | G06V 10/46 382/203 |
| 2014/0306999 A1* | 10/2014 | Yim | G06T 3/40 345/635 |
| 2019/0378204 A1* | 12/2019 | Ayush | G06Q 30/0643 |
| 2020/0265495 A1* | 8/2020 | Cho | G06F 16/5854 |
| 2020/0349365 A1* | 11/2020 | Behrendt | G06V 20/64 |
| 2020/0349464 A1* | 11/2020 | Lin | G06N 3/084 |
| 2020/0356718 A1* | 11/2020 | Chu | G06N 3/08 |
| 2020/0372633 A1* | 11/2020 | Lee | G06N 3/045 |
| 2021/0073597 A1* | 3/2021 | Han | G06F 18/214 |
| 2021/0166049 A1* | 6/2021 | Tariq | G06V 10/25 |
| 2021/0365724 A1* | 11/2021 | Lee | G06T 7/73 |
| 2022/0148328 A1* | 5/2022 | Ye | G06V 10/82 |
| 2022/0301258 A1* | 9/2022 | Song | G06T 15/10 |
| 2024/0203085 A1* | 6/2024 | Bangalath | G06V 20/58 |

FOREIGN PATENT DOCUMENTS

| | | |
|---|---|---|
| KR | 1020190085519 A | 7/2019 |
| KR | 102073162 B1 | 3/2020 |
| KR | 102095685 B1 | 4/2020 |
| KR | 1020200036098 A | 4/2020 |
| KR | 102108951 B1 | 5/2020 |
| KR | 102112859 B1 | 5/2020 |

OTHER PUBLICATIONS

Liu et al., "Rotated Region Based CNN for Ship Detection," Sep. 17, 2017, 5 pages.

Ma et al., "Arbitrary-Oriented Scene Text Detection via Rotation Proposals," Mar. 15, 2018, 11 pages.

PCT International Search Report and Written Opinion, International Application No. PCT/KR2021/007003, International Filing Date Jun. 4, 2021, 7 pages.

Zhou et al., "Objects as Points," Apr. 25, 2019, 12 pages.

* cited by examiner

ANCHOR-FREE RPN-BASED OBJECT DETECTION METHOD

CROSS-REFERENCE TO RELATED APPLICATIONS

This application claims priority to and the benefit of Korean Patent Application No. 10-2020-0068889 filed in the Korean Intellectual Property Office on Jun. 8, 2020, the entire contents of which are incorporated herein by reference.

DESCRIPTION

Technical Field

The present disclosure relates to a computing device for detecting region information of objects included in an image, and more particularly, to a computing device for performing an object detecting method based on an anchor-free method.

BACKGROUND ART

As a technique for detecting an object included in an image in the related art, techniques, such as R-CNN, Fast R-CNN, and Faster R-CNN, have been used. In particular, the Faster R-CNN technique introduces the Region Proposal Network (RPN) structure to propose a region where an object exists. In the Faster R-CNN technique, after determining an anchor, a plurality of bounding boxes having a predetermined ratio and size are generated, and a region where an object exists is presented by processing the generated bounding boxes according to a specific reference.

In the recently proposed method of detecting a region of a rotating object, more bounding boxes are generated by adding a plurality of pieces of rotation angle information to the anchor-based bounding boxes described above, and a region where an object exists is presented by processing the generated bounding boxes based on a specific reference.

Since the anchor-based techniques excessively generate many bounding boxes for one object, the amount of calculation required for processing is also considerable. Therefore, there is a problem in that object region detection is not performed quickly.

Accordingly, there is a demand in the art for a technology capable of reducing the amount of calculation while maintaining the accuracy of $2^{nd}$-stage based object region detection methods.

DISCLOSURE

Technical Problem

The present disclosure has been conceived in response to the foregoing background art, and has been made in an effort to provide an image object detecting method by using an artificial neural network.

Technical Solution

In order to solve the foregoing object, an exemplary embodiment of the present disclosure discloses a computing device for generating region information of at least one object included in an image, the computing device including: a memory including computer-executable components; and a processor for executing the computer-executable components stored in the memory, in which the computer-executable components include: a key point heat map generation component for generating, for the image, a key point heat map including key point information of the at least one object; a non-rotating bounding box generation component for generating a non-rotating bounding box based on the generated key point heat map; a rotating bounding box generation component for generating a rotating bounding box by using the non-rotating bounding box; and a final bounding box generation component for representing a region occupied by the at least one object in the image by using at least one of the non-rotating bounding box or the rotating bounding box.

The key point heat map may include information about a probability that each of the at least one pixel included in the image is a center point of the at least one object.

The key point heat map generation component may correspond a pixel corresponding to a center point of the object among pixels included in the image to a key point, and correspond a pixel other than the pixel corresponding to the center point of the object among the pixels included in the image to a background.

The key point heat map generation component may be trained using a loss function based on the number of at least one object and ground truth about the center point of each of the at least one object.

The non-rotating bounding box generation component may determine at least one of size information and shape information of the at least one object, and generate a non-rotating bounding box of each of the at least one object based on at least one of the determined size information and shape information.

The non-rotating bounding box generation component may include a neural network trained based on ground truth information of a size of the at least one object in order to determine size information of the at least one object.

The rotating bounding box generation component may generate one or more candidate rotating bounding boxes by adding one or more candidate rotation angle information to the generated non-rotating bounding boxes.

The rotating bounding box generation component may determine a candidate rotating bounding box in which Intersection Over Union (IoU) with a corresponding object region satisfies a predetermined reference from among the one or more candidate rotating bounding boxes as a rotating bounding box.

The rotating bounding box generation component may perform Rotated Region Of Interest (RROI) pooling, and the final bounding box generation component may generate a final bounding box based on a result of the RROI pooling.

The non-rotating bounding box generation component may perform ROI pooling and the rotating bounding box generation component performs RROI pooling, and the final bounding box generation component may generate a final bounding box by using a result of the ROI pooling and a result of the RROI pooling.

In order to solve the foregoing object, another exemplary embodiment of the present disclosure a method of generating, by a computing device, region information of at least one object included in an image, the method including: generating a key point heat map including key point information of the at least one object with respect to the image; generating a non-rotating bounding box based on the generated key point heat map; generating a rotating bounding box by using the non-rotating bounding box; and generating a final bounding box representing a region occupied by the at least one object in the image by using at least one of the non-rotating bounding box or the rotating bounding box.

In order to solve the foregoing object, still another exemplary embodiment of the present disclosure discloses a computer program stored in a computer-readable storage medium, the computer program including instructions for causing one or more processors to generate region information of at least one object included in an image, the instructions including: generating a key point heat map including key point information of the at least one object with respect to the image; generating a non-rotating bounding box based on the generated key point heat map; generating a rotating bounding box by using the non-rotating bounding box; and generating a final bounding box representing a region occupied by the at least one object in the image by using at least one of the non-rotating bounding box or the rotating bounding box.

Advantageous Effects

The present disclosure may provide a method for detecting an object in an image by using an artificial neural network.

BEST MODE

Figure 1:
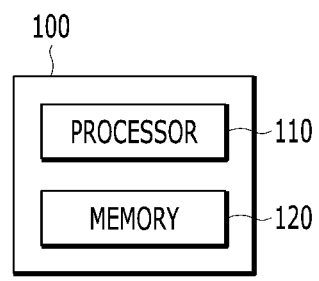
FIG. 1 is a block diagram of a computing device for generating region information of at least one object included in an image according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for generating region information of at least one object included in an image according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110 and a memory 120.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 120 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 120 may store any type of information generated or determined by the processor 110 and any type of information received by the network unit.

According to an exemplary embodiment of the present disclosure, the memory 120 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 120 on the Internet. The description of the memory is just an example and the present disclosure is not limited thereto.

The network unit according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit according to an exemplary embodiment of the present disclosure may use an arbitrary type known wired/wireless communication systems.

Figure 2:
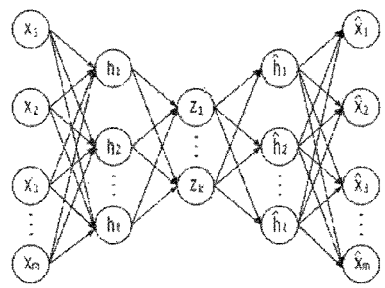
FIG. 2 is a schematic diagram illustrating a network function according to the exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 3:
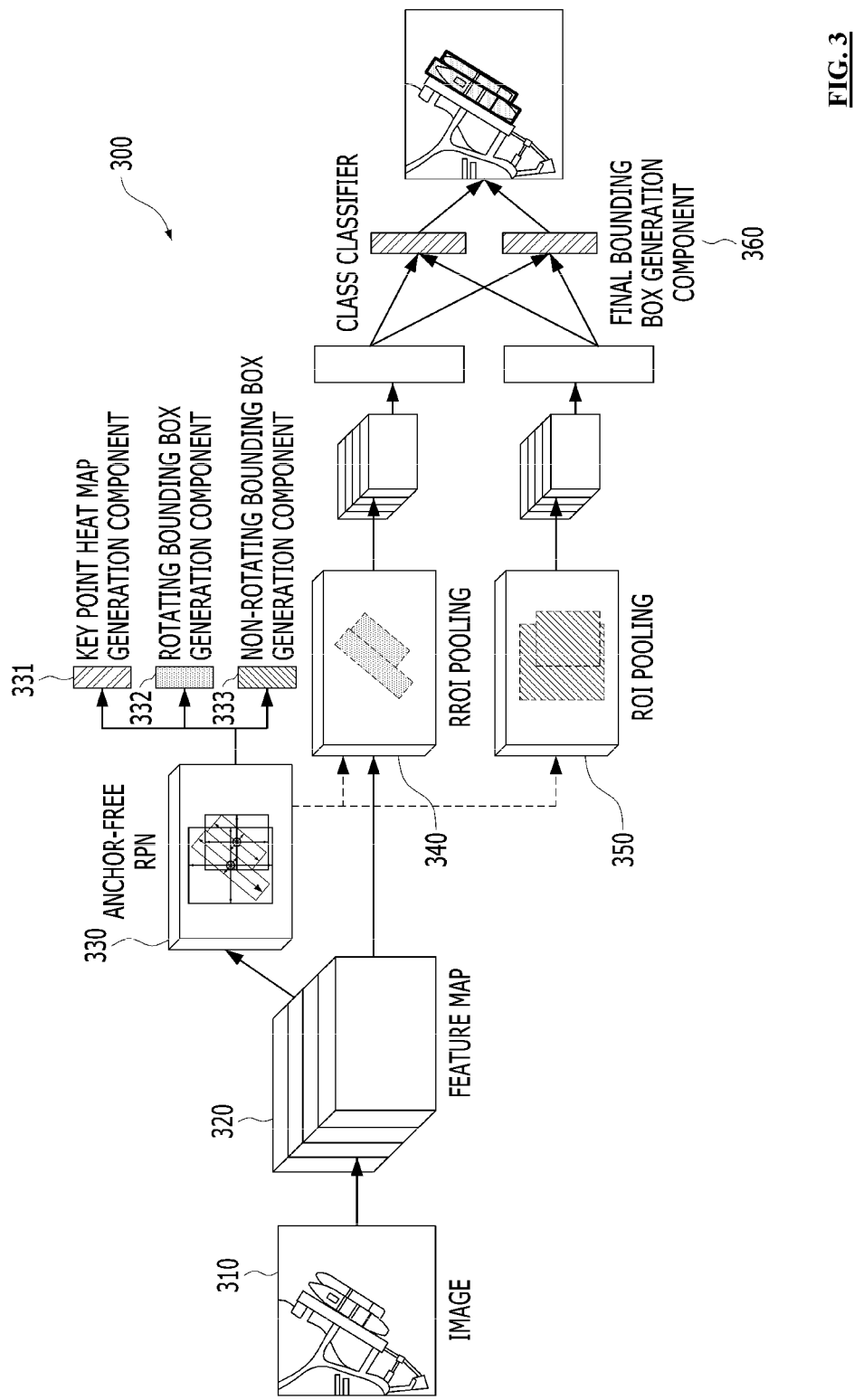
FIG. 3 is a conceptual diagram illustrating computer-executable components stored in a memory to generate region information of at least one object included in an image according to an exemplary embodiment of the present disclosure.

FIG. 3 is a conceptual diagram illustrating computer-executable components stored in a memory to generate region information of at least one object included in an image according to an exemplary embodiment of the present disclosure.

The processor 110 according to some exemplary embodiments of the present disclosure may generate information on a region occupied by at least one object included in an image 310 without using an anchor. In particular, in some exemplary embodiments of the present disclosure, at least one object may exist in an inclined state in an image, and the processor 110 may generate region information of the inclined (or rotated) object to correspond to the inclined object.

The processor 110 may generate object region information in the form of a bounding box. The bounding box may be expressed by coordinates of the center of the bounding box in the image and size information (for example, width, height) of the bounding box. Furthermore, the rotated bounding box may be expressed by using rotation angle information in addition to the center coordinate and the size information. Details of the bounding box will be described later.

The processor 110 may convert the image 310 into one or more feature maps 320. The conversion to the feature map 320 may be performed using a general Convolutional Artificial Neural Network (CNN) pre-trained by using ImageNet or the like. However, the image 310 does not have to be converted into the feature map 320 to be input to the anchor-free Region Proposal Network (RPN), and this is only an example of input data of the anchor-free RPN 330. Accordingly, the input data of the anchor-free RPN 330 should not be limited to the feature map 320.

An anchor-free RPN 330 executed by the processor 110 may generate a non-rotating bounding box, a rotating bounding box, and a key point heat map of at least one object without using anchors. To this end, the anchor-free RPN 330 may include a key point heat map generation component 331, a rotating bounding box generation component 332 and a non-rotating bounding box generation component 333. Furthermore, in FIG. 3, the anchor-free RPN 330, an ROI pooling layer 350, and an RROI pooling layer 340 are shown separately, but the ROI pooling layer 350 and the RROI pooling layer 340 may be configured as one layer of the anchor-free RPN 330.

The anchor-free RPN 330 may determine size information of at least one object included in the image 310 in order to generate a bounding box based on key point information included in the key point heat map. The key point heat map generation component 331, the rotating bounding box generation component 332 and the non-rotating bounding box generation component 333 may be trained to calculate size information of at least one object included in the image 310. The size information may be calculated for each class of objects included in the image 310. In order to reduce the amount of calculation, the size information can be calculated regardless of the class of the object included in the image 310.

The processor 110 may generate a non-rotating bounding box, a rotating bounding box, and a key point heat map by using the anchor-free RPN 330. The non-rotating bounding box, the rotating bounding box, and the key point heat map may be simultaneously generated by the anchor-free RPN 330. In one exemplary embodiment, the processor 110 may operate the anchor-free RPN 330 so that the key point heat map generation component 331 generates the key point heat map, the rotating bounding box generation component 332 generates the rotating bounding box, and the non-rotating bounding box generation component 333 generates the non-rotating bounding box. Specifically, the processor 110 may cause the rotating bounding box generation component 332 and the non-rotating bounding box generation component 333 to generate one or more rotating bounding boxes and non-rotating bounding boxes, respectively, and may cause the key point heat map generation component 331 to generate a key point heat map. Thereafter, the processor 110 may collect a non-rotating bounding box and a rotating bounding box corresponding to the key point information by using the key point information included in the generated key point heat map. The processor 110 may determine the generated non-rotating bounding box and rotating bounding box as a result of the anchor-free RPN 330. Here, the non-rotating bounding box or the rotating bounding box corresponding to the key point information may be a non-rotating bounding box and a rotating bounding box in which the key points included in the key point heat map and the center point of the bounding box are located within a certain distance, or the key points and the center point of the bounding box coincide.

The key point heat map, the non-rotating bounding box, and the rotating bounding box may be sequentially or asynchronously generated. In the exemplary embodiment, the anchor-free RPN 330 may generate a key point heat map by using the key point heat map generation component 331, generate a non-rotating bounding box by using the generated key point heat map and the non-rotating bounding box generation component 333, and generate a rotating bounding box by using the generated non-rotating bounding box or the rotating bounding box generation component 332.

Since the operation methods of the anchor-free RPN 330 described above are only examples, the operation method and interrelationship of the anchor-free RPN 330 and the key point heat map generation component 331, the rotating bounding box generation component 332, and the non-rotating bounding box generation component 333 included in the anchor-free RPN 330 should not be limited thereto.

In the existing object region detection methods, such as R-CNN, Fast R-CNN, and Faster R-CNN, after a plurality of candidate bounding boxes of a predetermined size is generated by using anchors, the generated candidate bounding boxes are divided into a background and an object, and when a plurality of bounding boxes overlap for one object, a Non-Maximal Suppression (NMS) algorithm is used. Essentially, the method may include excessive computations, such as the procedure of generating multiple bounding boxes for one object and the computation of Intersection over Union (IoU) for each of those bounding boxes. Furthermore, when rotation information is added to the existing object region detection method, the number of candidate bounding boxes increases by the number of cases for calculating rotation information. Accordingly, the amount of calculation may rapidly increase in response to the increase in the number of candidate bounding boxes.

By the operation of the anchor-free RPN 330 described above, anchor-free region information (particularly, region proposal through a bounding box in the RPN) may be generated. The aforementioned anchor-free RPN 330 does not generate a plurality of candidate non-rotating bounding boxes based on the anchors. Therefore, a corresponding amount of unnecessary IoU calculations may be omitted, so that the generation of the object region information for the object region detection according to the present disclosure may be performed more efficiently.

Based on the key point heat map, the non-rotating bounding box, and the rotating bounding box generated by the anchor-free RPN 330, the class of the object may be identified and region information about the region occupied by the object in the image may be generated. Specifically, the processor 110 may generate region information of the object including a final bounding box by inputting at least one of a Region of Interest (ROI) pooling layer and a Rotated Region Of Interest (RROI) pooling layer and at least one of the non-rotating bounding box or the rotating bounding box to the class classifier and the final bounding box generation component 360.

In one exemplary embodiment, the processor 110 may input the non-rotating bounding box generated by the non-rotating bounding box generation component 333 to the rotating bounding box generation component 332. In this case, the non-rotating bounding box input to the rotating bounding box generation component 332 may pass through the ROI pooling layer 350. The rotating bounding box generation component 332 may receive the non-rotating bounding box generated by the non-rotating bounding box generation component 333 or the non-rotating bounding box passed through the ROI pooling layer 350 and generate a rotating bounding box. The rotating bounding box generation component 332 may input the generated rotational bounding box to the RROI pooling layer 340 to make one or more rotating bounding boxes have the same size. The processor 110 may input the rotating bounding box that has passed through the RROI pooling layer 340 to the class classifier and the final bounding box generation component 360.

The class classifier may calculate class information of the object included in the final bounding box region. The class classifier may be constructed using a Support Vector Machine (SVM) or a neural network-based model capable of performing multi-class classification.

The final bounding box generation component 360 may be constructed based on a neural network in order to more accurately represent the position of the input rotating bounding box that has passed through the RROI pooling layer.

The configuration of the above-described class classifier and final bounding box generation component 360 is exemplary and the present disclosure is not limited to the above-described example.

The methods of generating object region information for object detection through a rotating bounding box in the related art do not pass through a process of generating a non-rotating bounding box. Therefore, in the methods in the related art, the processing result of the RROI pooling layer varies greatly depending on the rotation angle of the rotating bounding box generated by the Region Proposal Network (RPN), so that there is a problem in that object characteristics transmitted by the rotating bounding box for the generation of the region information are greatly different. Therefore, in order to prevent a problem caused by a change in a rotation angle, a first non-rotating bounding box is generated and then is rotated, thereby minimizing problems caused by a difference in the rotation angle.

In another exemplary embodiment, the processor 110 may classify objects included in the bounding box and generate a final bounding box by using both the non-rotating bounding box generated by the non-rotating bounding box generation component 333 and the rotating bounding box generated by the rotating bounding box generation component 332.

Specifically, the generated non-rotating bounding box may pass through the ROI pooling layer 350, and the generated rotating bounding box may pass through the RROI pooling layer 340. The processor 110 may input both the non-rotating bounding box passed through the ROI pooling layer 350 and the rotating bounding box passed through the RROI pooling layer 340 to the class classifier and the final bounding box generation component 360.

The operating method of the class classifier and the final bounding box generation component 360 described above is exemplary, and the present disclosure is not limited to the above example.

As described above, the methods of generating object region information for object detection through a rotating bounding box in the related art have a problem in that the characteristics of an object transmitted by the rotating bounding box vary greatly depending on the rotation angle of the rotating bounding box. As described above, when the region information generated through the non-rotating bounding box or the rotating bounding box is input to the classifier and the final bounding box, the problem caused by the rotation angle of the rotating bounding box is solved through the region information provided through the non-rotating bounding box. Furthermore, when both the non-rotating bounding box or the rotating bounding box are used, the region occupied by the object and the background region may be included. At this time, since the background information included in the bounding box provides context information, the background information may be effective in detecting a small object.

In the present disclosure, the feature map 320 may refer to data obtained by inputting the image 310 to a Convolutional Artificial Neural network (CNN) trained using ImageNet or the like. The generated feature map 320 may be input to the anchor-free RPN 330 to be used to generate a key point heat map, a non-rotating bounding box, and a rotating bounding box.

In the present disclosure, the generation of the feature map 320 by using the image and the pre-trained artificial neural network component may not be an essential process. That is, the processor 110 may directly input the image 310 into the anchor-free RPN 330 to cause the key point heat map generation component 331 to generate a key point heat map.

In the present disclosure, the anchor-free RPN 330 is a component that generates information about a region occupied by an object in the image 310 by generating a non-rotating bounding box and a rotating bounding box by using a key point heat map.

As described above, the anchor-free RPN 330 may include the key point heat map generation component 331, the rotating bounding box generation component 332, and the non-rotational bounding box generation component 333. By using the above components, the anchor-free RPN 330 may sequentially or simultaneously generate a key point heat map, a non-rotating bounding box, and a rotating bounding box.

By removing the anchors in the process of generating the bounding boxes for object detection, calculations required for generating unnecessary bounding boxes and selecting bounding boxes may be omitted. For example, the calculation of coordinate values required when a bounding box is generated, the Intersection over Union (IoU) calculation between the bounding box and the ground truth of the object occupied region, and the calculations required for performing the NMS algorithm based on the IoU values may be omitted.

In order to generate bounding boxes without using anchors, the anchor-free RPN 330 may be configured to generate at least one of size information and shape information of objects included in the image. The anchor-free RPN 330 may generate a non-rotating bounding box and a rotating bounding box by using the generated size information and shape information and the information included in the key point heat map.

The processor 110 may train the anchor-free RPN 330 to minimize a loss function based on a difference between size information of an object and ground truth data of a region occupied by the object. Based on the training method, the anchor-free RPN 330 may generate size information for generating bounding boxes for objects included in the image. The anchor-free RPN 330 may be trained to obtain size information of the objects included in the image differently for each class. Alternatively, the anchor-free RPN 330 may be trained to equally obtain size information of the objects included in the image for each class.

When the anchor-free RPN 330 is trained to uniformly determine the size information of the objects included in the image, the anchor-free RPN 330 may be less affected by the imbalance in the number of objects for each class included in the training image, making the training easy and stable. In addition, since it is unnecessary to calculate size information for the feature map for each of the plurality of classes, the amount of calculation for training the entire anchor-free RPN 330 is reduced.

Alternatively, with respect to the anchor-free RPN 330, the processor 110 may obtain shape information of the object by comparing data included in the key point heat map with ground truth data of a region occupied by the object in units of pixels.

In the present disclosure, the key point heat map generation component 331 may be a component that generates a key point heat map that provides information on whether an object exists or not in one image in units of pixels. The key point heat map generation component 331 may be constructed by using a neural network. The processor 110 may proceed with training to construct the key point heat map generation component 331.

The key point heat map generation component 331 may generate a key point heat map for each class of the object included in the image 310. Alternatively, the key point heat map generation component 331 may generate a key point heat map regardless of the class of the object included in the image 310.

When the key point heat map generation component 331 is trained to represent only information about whether an object exists or not for each pixel, regardless of the class of the object, the key point heat map generation component 331 may be less affected by imbalance for each class of the objects included in the training image. Therefore, the training of the key point heat map generation component 331 may be performed easily and stably.

In the exemplary embodiment, the key point heat map may include information about a probability that each of at least one pixel included in the image is the center point of at least one object. That is, in this case, each pixel in the key point heat map may indicate a probability that an arbitrary pixel is the center point of a specific object included in the image.

In another exemplary embodiment, the key point heat map generation component 331 may correspond the pixel corresponding to a center point of the object among the pixels included in the image to the key point, and correspond the pixel that is not the center point of the object among the pixels included in the image to the background. Specifically, when the key point heat map generation component 331 determines that the pixel included in the image 310 or the feature map 320 is the central point of the object, the key point heat map generation component 331 may correspond the pixel to the key point. In this case, the key point heat map generation component 331 may express the key point by corresponding the key point to the number "1". Conversely, when the key point heat map generation component 331 determines that the pixel included in the image 310 or the feature map 320 is the background of the object, the key point heat map generation component 331 may express the pixel by corresponding to the corresponding pixel to the number "0".

Alternatively, after the key point heat map generation component 331 calculates a probability that the pixels included in the image 310 or the feature map 320 correspond to the center point of the object, when the probability that each pixel is the center point is equal to or greater than a predetermined reference value, the key point heat map generation component 331 may determine the corresponding pixel as a key point, and when the corresponding pixel is less than the predetermined reference value, the key point heat map generation component 331 may determine the corresponding pixel as a background.

In another exemplary embodiment, the key point heat map generation component 331 is trained by using a loss function based on the number of at least one object and the ground truth about the center point of each of at least one objects. For example, when the key point heat map represents the probability that each pixel is the center point of the object, the loss function may be calculated by using the value of the key point heat map at each pixel and the ground truth (0 for the background, 1 for the center point). The processor 110 may train the key point heat map generation component 331 to minimize the loss function.

According to the characteristics of the above-described key point heat map and the characteristics of the training method of the key point heat map generation component 331, the key point heat map is not separately generated for each class. Therefore, it is possible to minimize the influence of imbalance in the number of data for each class included in the training data, and thus, the training of the key point heat map generation component 331 may be stably and easily performed.

Since the above description is merely an example of the key point heat map and the key point heat map generation component 331, the configuration method of the key point heat map and the key point heat map generation component should not be limited thereto.

In the present disclosure, the non-rotating bounding box generation component 333 may be a component that generates information about a region occupied by each of one or more objects included in the image 310 or the feature map 320 as a non-rotating bounding box. In some exemplary embodiments of the present disclosure, the non-rotating bounding box generation component 333 may be constructed based on a neural network.

In the present disclosure, the non-rotating bounding box generation component 333 may generate a non-rotating bounding box by using the key point heat map and at least one of the size information and the shape information of the object generated by the anchor-free RPN 330.

As described above, in the present disclosure, the non-rotating bounding box may be expressed by using coordinates of the center point and the size information or the shape information of the object corresponding to the non-rotating bounding box.

In one example, to this end, the non-rotating bounding box generation component 333 may determine at least one of size information or the shape information of at least one object, and generate the non-rotating bounding box of each of at least one object based on the determined size information or shape information. Specifically, the non-rotating bounding box generation component 333 may determine four vertex regions forming a square from the central point of the object determined through the key point heat map as coordinates of the bounding box. Alternatively, the non-rotating bounding box generation component may determine four vertices of a square including all pixels corresponding to the generated shape information based on the key point heat map as coordinates of the bounding box.

Here, the non-rotating bounding box generation component 333 may determine the pixels determined as the center point of the object in the key point heat map as the center coordinates of the non-rotating bounding box. To this end, the non-rotating bounding box generation component 333 may determine the pixels in which a probability value corresponding to a pixel in the key point heat map is equal to or greater than a predetermined reference value as the center point of the object.

Alternatively, the non-rotating bounding box generation component 333 may include a neural network trained based on the ground truth information of the size of at least one object in order to determine the size information of at least one object. A module for determining size information of an object in the anchor-free RPN 330 described above may be constructed by using a neural network and configured as one element of the non-rotating bounding box generation component 333.

As described above, the processor 110 may generate a non-rotating bounding box by comparing the key point heat map and the ground truth without using an anchor. Therefore, since the amount of calculation according to the number of bounding box cases to be considered is significantly reduced compared to the case of using the anchors according to the related art, the time required for object region detection may be reduced. Furthermore, in the anchor-free based region detection method as in the present disclosure, since numerous bounding boxes are not generated for one object, the NMS algorithm may not be required to be performed. Therefore, in the object detection method in the related art, it is possible to avoid the loss of the bounding box for dense objects, which may be a problem when the NMS algorithm is performed.

In the present disclosure, the rotating bounding box generation component 332 may be a component that generates information about a region occupied by each of one or more objects included in the image 310 or the feature map 320 in the form of a rotating bounding box. In some exemplary embodiments of the present disclosure, the rotating bounding box generation component 332 may be constructed based on a neural network.

In this disclosure, the rotating bounding box generation component 332 may generate a rotating bounding box by using at least one of the key point heat map and the size information and the shape information of the object generated by the anchor-free RPN 330.

As described above, in the present disclosure, the rotating bounding box may be expressed by using the coordinates of the center point of the object corresponding to the rotating bounding box, and the rotation angle information and the size information or the shape information of the bounding box.

In one example, to this end, the rotating bounding box generation component 332 may determine at least one of the size information or the shape information of at least one object, and generate a rotating bounding box of each of at least one object based on the determined size information or shape information. Specifically, the rotating bounding box generation component 332 may determine four vertex regions forming a square inclined by the rotation angle information from the center point of the object determined through the key point heat map as coordinates of the bounding box. Alternatively, the rotating bounding box generation component may determine four vertices of a square inclined by the rotation angle information including all pixels corresponding to the generated shape information with the key point heat map as the center as coordinates of the rotating bounding box.

In order to determine the rotation angle information of the rotating bounding box, the rotating bounding box generation component 332 may recognize a plurality of candidate rotation angle information, and generate a plurality of candidate rotating bounding boxes corresponding to the plurality of candidate rotation angle information. A plurality of candidate rotation angles may be pre-stored in the memory 120. For example, the plurality of candidate rotation angles may be −180 degrees, −90 degrees, 0 degree, 90 degrees, and 180 degrees. The rotating bounding box generation component 332 may determine a candidate rotating bounding box that satisfies a predetermined reference among the plurality of candidate rotating bounding boxes as the rotating bounding box.

Alternatively, the rotating bounding box generation component 332 may be configured to generate rotation angle information that minimizes a difference value generated based on the difference between the pixels included in the candidate rotating bounding box and the region occupied by the object in the image 310 or feature map 320 and generate a candidate rotating bounding box based on the generated rotation angle information.

Specifically, the rotating bounding box generation component 332 according to the exemplary embodiment of the present disclosure may generate one or more candidate rotating bounding boxes by adding one or more candidate rotation angle information to the generated non-rotating bounding box.

In another exemplary embodiment, the rotating bounding box generation component 332 may determine a candidate rotating bounding box in which Intersection Over Union (IoU) with a corresponding object region satisfies a predetermined reference among the one or more candidate rotating bounding boxes as the rotating bounding box. Here, the predetermined reference may be a rotating bounding box having the highest IoU among the plurality of candidate rotating bounding boxes.

Also, the rotating bounding box generation component may perform Rotated Region Of Interest (RROI) pooling, and the final bounding box generation component may generate a final bounding box based on a result of the RROI pooling.

In the present disclosure, the RROI pooling layer 340 and the ROI pooling layer 350 are components for reconstructing the non-rotating bounding box or the rotating bounding box generated in the anchor-free RPN 330 to have the same size. The ROI pooling layer and the RROI pooling layer may adjust strides in the ROI pooling layer and the RROI pooling layer in order to reconstruct the bounding boxes having different sizes into the same size.

In this disclosure, the final bounding box generation component 360 is a component that determines the final bounding box based on at least one of the non-rotating bounding box that has passed through the ROI pooling layer and the rotating bounding box that has passed through the RROI pooling layer. The final bounding box generation component 360 may be constructed based on a neural network in order to more accurately represent the position of the rotating bounding box that has passed through the input RROI pooling layer.

In the exemplary embodiment, the non-rotating bounding box generation component may perform the ROI pooling, the rotating bounding box generation component may perform the RROI pooling, and the final bounding box generation component may generate a final bounding box using a result of the ROI pooling and a result of the RROI pooling.

As described above, since the result of the RROI pooling has a disadvantage of being sensitive to angular error, it may be necessary to reduce the disadvantage by combining the result of the RROI pooling with the result of the ROI pooling of the non-rotating bounding box. In addition, by adding the non-rotating bounding box to the rotating region detection process, background information that may be included in the bounding box is context information, and a performance effect may be expected when a small object is detected.

Figure 4:
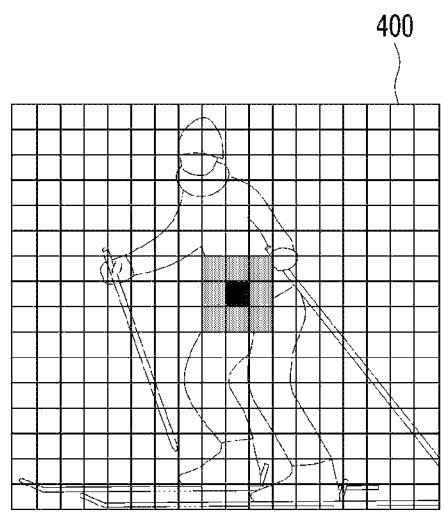
FIG. 4 illustrates a key point heat map according to an exemplary embodiment of the present disclosure.

FIG. 4 illustrates the key point heat map according to the exemplary embodiment of the present disclosure.

In the present disclosure, a key point heat map is data that provides information on whether an object exists or not in one image in units of pixels, and may be generated by the key point heat map generation component 331. The key point heat map generation component 331 may be constructed by using a neural network. The processor 110 may proceed with training to build the key point heat map generation component 331.

Referring to FIG. 4, the key point heat map 410 may represent information about whether each of the small squares is a center point of a region occupied by a skier, which is an object included in the image, in the image. The information on whether the square is the center point may correspond to the background and the center point (0 for the background, and 1 for the center point), or may be expressed as a probability that the square is the center point. The key point heat map generation component 331 may determine pixels (pixels represented by a color other than white) having a probability that the pixel is the center point is equal to or greater than a predetermined reference as the center point. Alternatively, the key point heat map generation component 331 may determine a pixel having the highest probability that the pixel is the center point (a pixel expressed in the darkest color) as the center point.

The key point heat map 410 may be generated for each class of the object included in the image 310 by the key point heat map generation component 331. Alternatively, the key point heat map 410 may be generated regardless of the class of the object included in the image 310 by the key point heat map generation component 331.

When the key point heat map generation component 331 is trained to represent only information about whether an object exists or not for each pixel, regardless of the class of the object, the key point heat map generation component 331 may be less affected by imbalance for each class of the objects included in the training image. Therefore, the training of the key point heat map generation component 331 may be performed easily and stably.

In the exemplary embodiment, the key point heat map may include information about a probability that each of at least one pixel included in the image is the center point of at least one object. That is, in this case, each pixel in the key point heat map may indicate a probability that an arbitrary pixel is the center point of a specific object included in the image.

In another exemplary embodiment, the key point heat map generation component 331 may correspond the pixel corresponding to the center point of the object among the pixels included in the image to the key point, and correspond the pixel that is not the center point of the object among the pixels included in the image to the background. Specifically, when the key point heat map generation component 331 determines that the pixel included in the image 310 or the feature map 320 is the central point of the object, the key point heat map generation component 331 may correspond the pixel to the key point. In this case, the key point heat map generation component 331 may express the key point by corresponding the key point to the number "1". Conversely, when the key point heat map generation component 331 determines that the pixel included in the image 310 or the feature map 320 is the background of the object, the key point heat map generation component 331 may express the pixel by corresponding to the corresponding pixel to the number "0".

Alternatively, after the key point heat map generation component 331 calculates a probability that the pixels included in the image 310 or the feature map 320 correspond to the center point of the object, when the probability that each pixel is the center point is equal to or greater than a predetermined reference value, the key point heat map generation component 331 may determine the corresponding pixel as a key point, and when the corresponding pixel is less than the predetermined reference value, the key point heat map generation component 331 may determine the corresponding pixel as a background.

In another exemplary embodiment, the key point heat map generation component 331 is trained by using a loss function based on the number of at least one objects and the ground truth about the center point of each of at least one object. For example, when the key point heat map represents the probability that each pixel is the center point of the object, the loss function may be calculated by using the value of the key point heat map at each pixel and the ground truth (0 for the background, 1 for the center point). The processor 110 may train the key point heat map generation component 331 to minimize the loss function.

According to the characteristics of the above-described key point heat map and the characteristics of the training method of the key point heat map generation component 331, the key point heat map is not separately generated for each class. Therefore, it is possible to minimize the influence of imbalance in the number of data for each class included in the training data, and thus, the training of the key point heat map generation component 331 may be stably and easily performed.

Since the above description is merely an example of the key point heat map and the key point heat map generation component 331, the configuration method of the key point heat map and the key point heat map generation component should not be limited thereto.

Figure 5A:
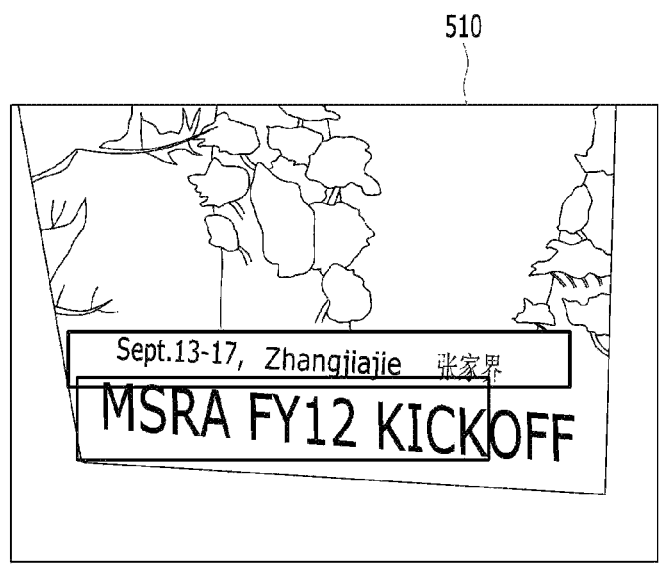
FIG. 5A illustrates a non-rotating bounding box according to the exemplary embodiment of the present disclosure.

FIG. 5A illustrates the non-rotating bounding box according to the exemplary embodiment of the present disclosure.

In the present disclosure, the non-rotating bounding box 510 may be information about a region occupied by each of one or more objects included in the image 310 or the feature map 320. The non-rotating bounding box 510 may be generated by the non-rotating bounding box generation component 333. In some exemplary embodiments of the present disclosure, the non-rotating bounding box generation component 333 may be constructed based on a neural network.

As described above, in the present disclosure, the non-rotating bounding box may be expressed by using coordinates of the center point and the size information or the shape information of the object corresponding to the non-rotating bounding box. Correspondingly, the non-rotating bounding box generation component 333 may generate a non-rotating bounding box by using by the key point heat map and at least one of the size information and the shape information of the object generated by the anchor-free RPN 330.

The size information of the non-rotating bounding box 510 may be different for each object class or for each object. Alternatively, the size information of the non-rotating bounding box 510 according to some exemplary embodiments of the present disclosure may be uniformly set. When the size of the non-rotating bounding box 510 is uniformly set, the amount of calculation required for the object detection method according to the present disclosure may be reduced. Also, in this case, background information is included for relatively small-sized objects, and the background information may be effective for object detection as context information.

In one example, to this end, the non-rotating bounding box generation component 333 may determine at least one of size information or the shape information of at least one object, and generate the non-rotating bounding box of each of at least one object based on the determined size information or shape information. Specifically, the non-rotating bounding box generation component 333 may determine four vertex regions forming a square from the central point of the object determined through the key point heat map as coordinates of the bounding box. Alternatively, the non-rotating bounding box generation component may determine four vertices of a square including all pixels corresponding to the generated shape information with the key point heat map as the center as coordinates of the bounding box.

Here, the non-rotating bounding box generation component 333 may determine the pixels determined as the center point of the object in the key point heat map as the center coordinates of the non-rotating bounding box. To this end, the non-rotating bounding box generation component 333 may determine the pixels in which a probability value corresponding to a pixel in the key point heat map is equal to or greater than a predetermined reference value as the center point of the object.

Alternatively, the non-rotating bounding box generation component 333 may include a neural network trained based on the ground truth information of the size of at least one object in order to determine the size information of at least one object. A module for determining size information and shape information of an object in the anchor-free RPN 330 described above may be constructed by using a neural network and configured as one element of the non-rotating bounding box generation component 333.

Specifically, the non-rotating bounding box generation component 333 may be trained to minimize a loss function based on the difference between the size information of the object and the ground truth data of the region occupied by the object. Based on the above training method, the non-rotating bounding box generation component 333 may generate size information for generating bounding boxes for the objects included in the image. The non-rotating bounding box generation component 333 may be trained to obtain the size information of the objects included in the image differently for each class. Alternatively, the non-rotating bounding box generation component 333 may be trained to equally obtain the size information of the objects included in the image for each class.

When the non-rotating bounding box generation component 333 is trained to uniformly determine the size information of the objects included in the image, the non-rotating bounding box generation component 333 may be less affected from the imbalance in the number of objects each class included in the training image, so that the training may be performed easily and stably. In addition, since the calculation of the size information for the feature map for each of the plurality of classes is unnecessary, the amount of calculation for training the entire non-rotating bounding box generation component 333 is reduced.

Alternatively, the non-rotating bounding box generation component 333 may obtain shape information of the object by comparing data included in the key point heat map with ground truth data of the region occupied by the object in units of pixels.

Figure 5B:
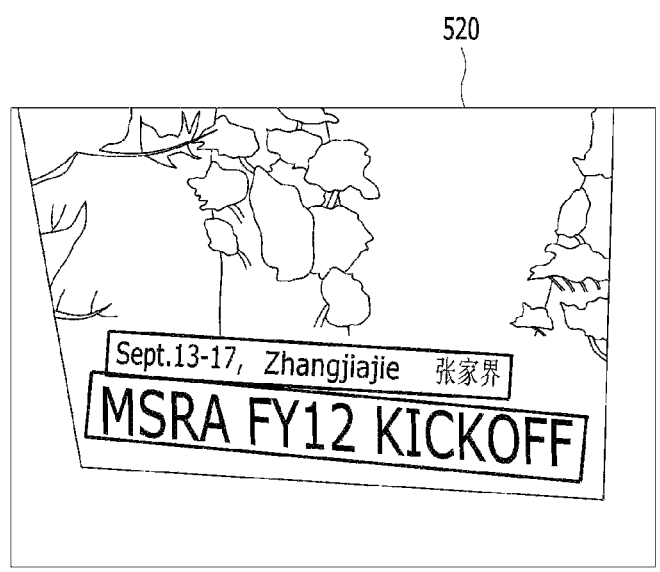
FIG. 5B illustrates a rotating bounding box according to the exemplary embodiment of the present disclosure.

As described above, the processor 110 may generate a non-rotating bounding box by comparing the key point heat map and the ground truth without using an anchor. For example, the processor 110 may cause the non-rotating bounding box generation component 333 to detect the center point of the object from the key point heat map, and determine size information and shape information of the object by using the size information and the shape information of the object generated based on the ground truth. The processor 110 may cause the non-rotating bounding box generation component 333 to determine the coordinates of the non-rotating bounding box by using the center point, the size information, and the shape information of the object. Therefore, since the amount of calculation according to the number of bounding box cases to be considered is significantly reduced compared to the case of using the anchors according to the related art, the time required for object region detection may be reduced. Furthermore, in the anchor-free based region detection method as in the present disclosure, since numerous bounding boxes are not generated for one object, the NMS algorithm may not be required to be performed. Therefore, in the object detection method in the related art, it is possible to avoid the loss of the bounding box for dense objects, which may be a problem when the NMS algorithm is performed FIG. 5B illustrates the rotating bounding box according to the exemplary embodiment of the present disclosure.

In the present disclosure, the rotating bounding box 520 may be information expressed in a rotating bounding box form of information about a region occupied by each of one or more objects included in the image 310 or the feature map 320. The rotating bounding box 520 may be generated by the rotating bounding box generation component 332. In some exemplary embodiments of the present disclosure, the rotating bounding box generation component 332 may be constructed based on a neural network. A module for determining size information and shape information of an object in the anchor-free RPN 330 described above may be constructed by using a neural network and configured as one element of the rotating bounding box generation component 332. Alternatively, the rotating bounding box generation component 332 may use the size information and the shape information of the object generated from the anchor-free RPN 330.

Specifically, the rotating bounding box generation component 332 may be trained to minimize a loss function based on the difference between the size information of the object and the ground truth data of the region occupied by the object. Based on the above training method, the rotating bounding box generation component 332 may generate size information for generating bounding boxes for the objects included in the image. The rotating bounding box generation component 332 may be trained to obtain size information of the objects included in the image differently for each class. Alternatively, the rotating bounding box generation component 332 may be trained to equally obtain size information of the objects included in the image for each class.

When the rotating bounding box generation component 332 is trained to uniformly determine the size information of the objects included in the image, the rotating bounding box generation component 332 may be less affected from the imbalance in the number of objects each class included in the training image, so that the training may be performed easily and stably. In addition, since the calculation of the size information for the feature map for each of the plurality of classes is unnecessary, the amount of calculation for training the entire rotating bounding box generation component 332 is reduced.

Alternatively, the rotating bounding box generation component 332 may obtain shape information of the object by comparing data included in the key point heat map with ground truth data of the region occupied by the object in units of pixels.

In the present disclosure, the rotating bounding box 520 may be generated by using at least one of the key point heat map and the size information and the shape information of the object. Correspondingly, the rotating bounding box may be expressed by using the coordinates of the center point of the object corresponding to the rotating bounding box, and the rotation angle information and the size information or the shape information of the bounding box.

In one example, to this end, the rotating bounding box generation component 332 may determine at least one of the size information or the shape information of at least one object, and generate a rotating bounding box of each of at least one object based on the determined size information or shape information. Specifically, the rotating bounding box generation component 332 may determine four vertex regions forming a square inclined by the rotation angle information from the center point of the object determined through the key point heat map as coordinates of the bounding box. Alternatively, the rotating bounding box generation component may determine four vertices of a square inclined by the rotation angle information including all pixels corresponding to the generated shape information with the key point heat map as the center as coordinates of the rotating bounding box.

In order to determine the rotation angle information of the rotating bounding box, the rotating bounding box generation component 332 may recognize a plurality of candidate rotation angle information, and generate a plurality of candidate rotating bounding boxes corresponding to the plurality of candidate rotation angle information. A plurality of candidate rotation angles may be pre-stored in the memory 120. For example, the plurality of candidate rotation angles may be −180 degrees, −90 degrees, 0 degree, 90 degrees, and 180 degrees. The rotating bounding box generation component 332 may determine a candidate rotating bounding box that satisfies a predetermined reference among the plurality of candidate rotating bounding boxes as the rotating bounding box.

Alternatively, the rotating bounding box generation component 332 may be configured to generate rotation angle information that minimizes a difference value generated based on the difference between the pixels included in the candidate rotating bounding box and the region occupied by the object in the image 310 or feature map 320 and generate a candidate rotating bounding box based on the generated rotation angle information.

Specifically, the rotating bounding box generation component 332 according to the exemplary embodiment of the present disclosure may generate one or more candidate rotating bounding boxes by adding one or more candidate rotation angle information to the generated non-rotating bounding box.

In another exemplary embodiment, the rotating bounding box generation component 332 may determine a candidate rotating bounding box in which Intersection Over Union (IoU) with a corresponding object region satisfies a predetermined reference among the one or more candidate rotating bounding boxes as the rotating bounding box. Here, the predetermined reference may be a rotating bounding box having the highest IoU among the plurality of candidate rotating bounding boxes.

Also, the rotating bounding box generation component may perform Rotated Region Of Interest (RROI) pooling, and the final bounding box generation component may generate a final bounding box based on a result of the RROI pooling.

Figure 6:
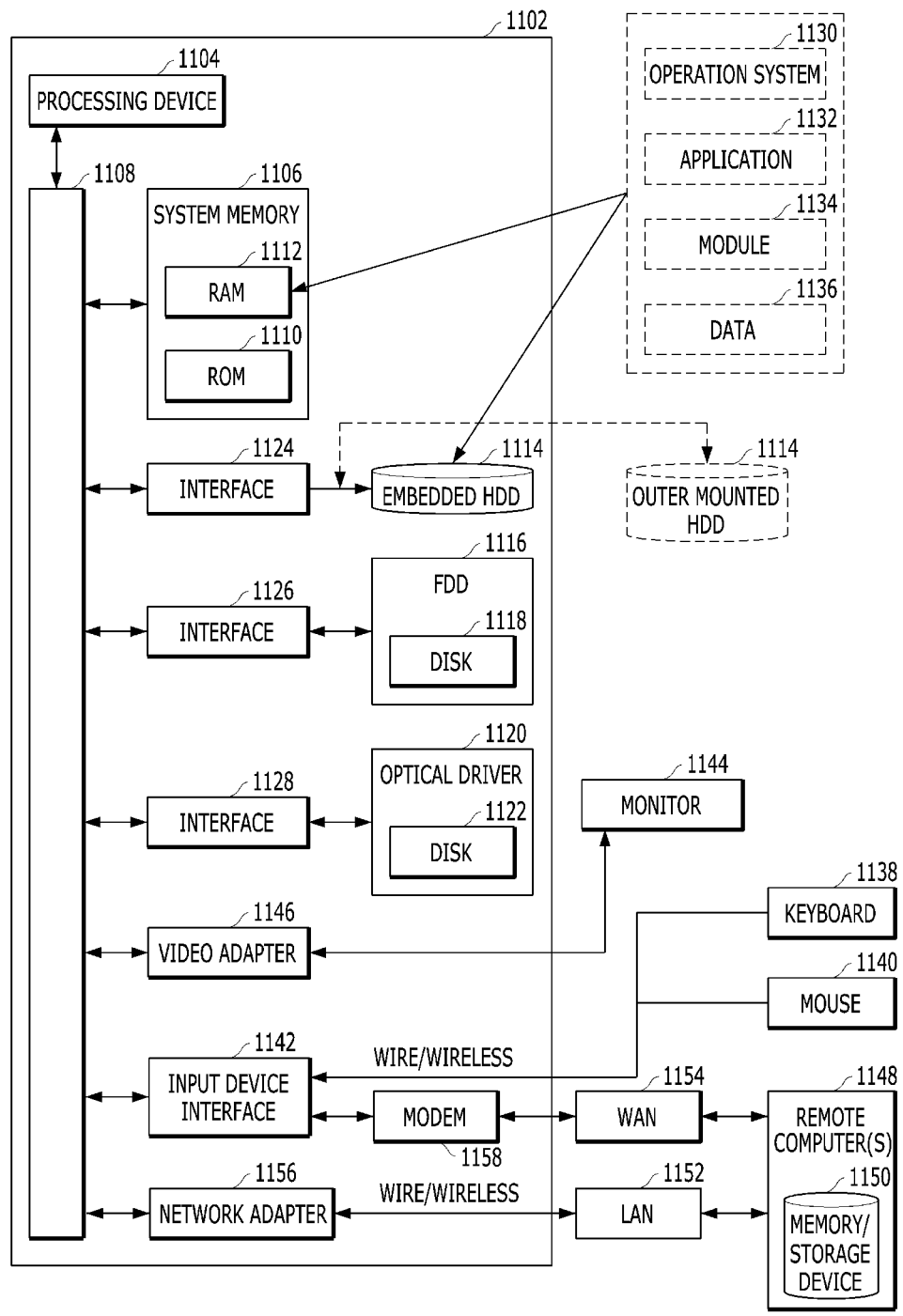
FIG. 6 is a simple and general schematic diagram illustrating an example of a computing environment in which the exemplary embodiments of the present disclosure are implementable.

FIG. 6 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

MODE FOR CARRYING OUT THE INVENTION

The related contents have been described in the best mode for carrying out the invention as described above.

INDUSTRIAL APPLICABILITY

The present disclosure relates to a method of detecting an object in an image using an artificial neural network, and may be used to implement a computing device for detecting region information of objects included in an image.

The invention claimed is:

1. A computing device for generating region information of at least one object included in an image, the computing device comprising:
a memory including computer-executable components; and
a processor for executing the computer-executable components stored in the memory,
wherein the computer-executable components include:
a key point heat map generation component for generating, for the image, a key point heat map including key point information of the at least one object;
a non-rotating bounding box generation component for generating a non-rotating bounding box based on the generated key point heat map;
a rotating bounding box generation component for generating a rotating bounding box by using the non-rotating bounding box; and
a final bounding box generation component for representing a region occupied by the at least one object in the image by using at least one of the non-rotating bounding box or the rotating bounding box.

2. The computing device of claim 1, wherein the key point heat map includes information about a probability that each of the at least one pixel included in the image is a center point of the at least one object.

3. The computing device of claim 1, wherein the key point heat map generation component corresponds a pixel corresponding to a center point of the object among pixels included in the image to a key point, and corresponds a pixel other than the pixel corresponding to the center point of the object among the pixels included in the image to a background.

4. The computing device of claim 3, wherein the key point heat map generation component is trained using a loss function based on the number of at least one object and ground truth about the center point of each of the at least one object.

5. The computing device of claim 1, wherein the non-rotating bounding box generation component determines at least one of size information and shape information of the at least one object, and generates a non-rotating bounding box of each of the at least one object based on at least one of the determined size information and shape information.

6. The computing device of claim 5, wherein the non-rotating bounding box generation component includes a neural network trained based on ground truth information of a size of the at least one object in order to determine size information of the at least one object.

7. The computing device of claim 1, wherein the rotating bounding box generation component generates one or more candidate rotating bounding boxes by adding one or more candidate rotation angle information to the generated non-rotating bounding boxes.

8. The computing device of claim 7, wherein the rotating bounding box generation component determines a candidate rotating bounding box in which Intersection Over Union (IoU) with a corresponding object region satisfies a predetermined reference from among the one or more candidate rotating bounding boxes as a rotating bounding box.

9. The computing device of claim 1, wherein the rotating bounding box generation component performs Rotated Region Of Interest (RROI) pooling, and
the final bounding box generation component generates a final bounding box based on a result of the RROI pooling.

10. The computing device of claim 1, wherein the non-rotating bounding box generation component performs ROI pooling and the rotating bounding box generation component performs RROI pooling, and
the final bounding box generation component generates a final bounding box by using a result of the ROI pooling and a result of the RROI pooling.

11. A method of generating, by a computing device, region information of at least one object included in an image, the method comprising:
generating a key point heat map including key point information of the at least one object with respect to the image;
generating a non-rotating bounding box based on the generated key point heat map;
generating a rotating bounding box by using the non-rotating bounding box; and generating a final bounding box representing a region occupied by the at least one object in the image by using at least one of the non-rotating bounding box or the rotating bounding box.

12. A non-transitory computer-readable storage medium storing computer program instructions for causing one or more processors to generate region information of at least one object included in an image, the instructions comprising:

generating a key point heat map including key point information of the at least one object with respect to the image;

generating a non-rotating bounding box based on the generated key point heat map;

generating a rotating bounding box by using the non-rotating bounding box; and generating a final bounding box representing a region occupied by the at least one object in the image by using at least one of the non-rotating bounding box or the rotating bounding box.

* * * * *